US009123183B1

(12) United States Patent
Hollis et al.

(10) Patent No.: US 9,123,183 B1
(45) Date of Patent: Sep. 1, 2015

(54) MULTI-LAYER DIGITAL ELEVATION MODEL

(75) Inventors: Howell Hollis, Orlando, FL (US); Zach Barth, Issaquah, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 187 days.

(21) Appl. No.: 13/611,199

(22) Filed: Sep. 12, 2012

Related U.S. Application Data

(60) Provisional application No. 61/553,205, filed on Oct. 30, 2011.

(51) Int. Cl.
G06T 15/00 (2011.01)
G06T 17/00 (2006.01)
G06T 15/80 (2011.01)

(52) U.S. Cl.
CPC ....................................... *G06T 15/80* (2013.01)

(58) Field of Classification Search
CPC combination set(s) only.
See application file for complete search history.

(56) References Cited

U.S. PATENT DOCUMENTS

| | | | |
|---|---|---|---|
| 6,707,458 B1 | 3/2004 | Leather et al. | |
| 6,879,324 B1 | 4/2005 | Hoppe | |
| 6,995,761 B1 | 2/2006 | Schroeder et al. | |
| 7,280,109 B2 | 10/2007 | Hoppe | |
| 7,539,606 B2 | 5/2009 | Comair et al. | |
| 7,872,647 B2 | 1/2011 | Mayer et al. | |
| 7,948,485 B1 | 5/2011 | Larsen et al. | |
| 7,983,474 B2 | 7/2011 | Van Workum et al. | |
| 8,638,330 B1 | 1/2014 | Praun et al. | |
| 2001/0035867 A1 | 11/2001 | Murayama et al. | |
| 2002/0101419 A1 | 8/2002 | Cook | |
| 2002/0118190 A1 | 8/2002 | Greasley | |
| 2003/0038816 A1 | 2/2003 | Ohta | |
| 2003/0085895 A1 | 5/2003 | Oka | |
| 2003/0090484 A1 | 5/2003 | Comair et al. | |
| 2003/0112235 A1 | 6/2003 | Grace | |
| 2003/0125111 A1 | 7/2003 | Oka | |
| 2004/0181382 A1 | 9/2004 | Hu et al. | |
| 2006/0018566 A1 | 1/2006 | Coleman et al. | |
| 2006/0170693 A1* | 8/2006 | Bethune et al. | 345/568 |
| 2006/0176303 A1 | 8/2006 | Fairclough | |
| 2007/0038421 A1 | 2/2007 | Hu et al. | |
| 2007/0257903 A1 | 11/2007 | Gutierrez et al. | |
| 2008/0143713 A1 | 6/2008 | Chiu et al. | |

(Continued)

OTHER PUBLICATIONS

"Boston, Massachusetts Region, Digital Elevation Model with Bathymetry," Harvard Map Collection, Harvard College Library, 2009, 4 pages.

(Continued)

*Primary Examiner* — Leon T Cain, II
(74) *Attorney, Agent, or Firm* — Withrow & Terranova, PLLC

(57) ABSTRACT

A multi-layer digital elevation model (DEM) structure is disclosed. A device may access a first structure that comprises a plurality of first elevation values and a plurality of location identifiers that may correspond to a geographic region. The first elevation values may be associated with a first layer in the geographic region and correspond to respective location identifiers. The device may access a second structure that identifies a second layer in the geographic region. Second elevation values that may correspond to at least some of the plurality of location identifiers may be determined. A multi-layer DEM structure may be generated that stores the first elevation values and the second elevation values in association with corresponding location identifiers.

21 Claims, 6 Drawing Sheets

(56) References Cited

U.S. PATENT DOCUMENTS

| | | | |
|---|---|---|---|
| 2008/0208468 A1 | 8/2008 | Martin | |
| 2009/0089018 A1* | 4/2009 | Kelley et al. | 703/1 |
| 2010/0238161 A1 | 9/2010 | Varga et al. | |
| 2011/0055746 A1 | 3/2011 | Mantovani et al. | |
| 2011/0295575 A1* | 12/2011 | Levine et al. | 703/2 |

OTHER PUBLICATIONS

"Digital elevation model," Wikipedia, published as early as Feb. 18, 2012, 6 pages.

"Microsoft ESP SDK: Enabling customized and immersive simulation experiences," White Paper, Nov. 2007, 11 pages.

Bruneton, E. et al., "Real-time rendering and editing of vector-based terrains," Eurographics, vol. 27, No. 2, 2008, pp. 311-320.

Pajarola, R., "Large scale terrain visualization using the restricted quadtree triangulation," Proceedings Visualization, vol. 98, Oct. 1998, pp. 19-26.

Szofran, A. et al., "Microsoft ESP: Global terrain technology for Microsoft ESP," Jan. 2008, 22 pages.

Tsai, F. et al., "Adaptive level of detail for large terrain visualization," The International Archives of the Photogrammetry, Remote Sensing and Spatial Information Sciences, vol. XXXVII, Part B4, Beijing, 2008, pp. 579-584.

Non-Final Office Action for U.S. Appl. No. 13/611,014, mailed Sep. 22, 2014, 23 pages.

Non-Final Office Action for U.S. Appl. No. 13/663,619, mailed Dec. 3, 2014, 13 pages.

Pajarola, R., "Overview of Quadtree-based Terrain Triangulation and Visualization," UCI-ICS Technical Report No. 02-01, Department of Information & Computer Science, University of California, Irvine, Jan. 2002, 16 pages.

Notice of Allowance for U.S. Appl. No. 13/611,014, mailed Mar. 17, 2015, 13 pages.

* cited by examiner

MULTI-LAYER DIGITAL ELEVATION MODEL

RELATED APPLICATIONS

This application claims the benefit of provisional patent application Ser. No. 61/553,205, filed Oct. 30, 2011, the disclosure of which is hereby incorporated herein by reference in its entirety. The application is related to "CONCURRENT MESH GENERATION IN A COMPUTER SIMULATION," filed on even date herewith, which is commonly owned and assigned and is hereby incorporated herein by reference in its entirety.

TECHNICAL FIELD

Aspects of embodiments relate to simulations, and in particular to a multiple-layer digital elevation model used to provide simulations of a geographic region.

BACKGROUND

A digital elevation model (DEM) identifies, for each identified location within a geographic region, an elevation at such location. Typically, locations are identified within the geographic regions at a particular resolution, such as every two meters. DEMs are commonly used, for example, by a simulator to determine the locations of objects in the simulated environment, and to depict the simulated environment to a user.

In some circumstances, it may be desirable or necessary for an application, such as a simulator, to process information regarding multiple elevations at the same identified location within a geographic region. For example, it may be desirable to know both a bathymetric elevation that identifies an ocean floor at a particular location, and an elevation of the ocean surface at that particular location, to properly simulate the environment. In order to determine such information, multiple different sources of data are accessed. The different sources of data may be at different resolutions, may be in completely different formats, and may require source-specific processing in order to calculate the desired elevation information. In a run-time environment it may be impractical, or impossible, to access multiple different sources of data and perform the necessary processing in order to generate the desired elevation information while concurrently providing a high-resolution simulation to a user who is moving about the simulated environment.

SUMMARY

Embodiments relate to a multi-layer digital elevation model (DEM) structure that identifies multiple elevation values for a given location. The multi-layer DEM structure may be generated for an identified geographic region of interest at run-time, during an initialization phase of a simulation being provided to a user, and/or at other times during the simulation as new geographic regions become relevant to the simulation. Each layer in the multi-layer DEM structure may identify an elevation associated with the layer at a particular location. Each layer may be associated with a particular data type, such as a surface type. Non-limiting examples of surface types include a terrain surface type, a bathymetric surface type, and a water surface type. The multi-layer DEM structure may be used by the simulator, for example, to concurrently render imagery associated with multiple surface types without the need for the simulator to access multiple different data structures, thereby facilitating the presentation of high-fidelity simulations with multiple surface types in real time. The multi-layer DEM structure may also be used to quickly and efficiently generate one or more additional multi-layer DEM structures at resolutions that are different from the initially generated multi-layer DEM structure during the course of a simulation.

In one embodiment, a device may access a first structure, such as a single-layer DEM structure, that may comprise a plurality of first elevation values and a plurality of location identifiers that correspond to a geographic region. Each first elevation value may be associated with a first layer in the geographic region and may correspond to a different location identifier. For example, the single-layer DEM structure may identify elevation values for a layer that corresponds to terrain and bathymetric surfaces of the geographic region. The phrase "bathymetric surface" as used herein relates to terrain that may be under a body of water, such as an ocean, pond, river, or stream.

The device may access a second structure that may identify a second layer in the geographic region. For example, the second structure may identify certain features in the geographic region, such as rivers, ponds, oceans, and the like. Second elevation values for the second layer that correspond to some of the plurality of location identifiers may be determined. A multi-layer DEM structure, which stores the first elevation values and the second elevation values in association with corresponding location identifiers, may then be generated.

In one embodiment, the location identifiers in the single-layer DEM structure may identify locations in the geographic region at a first resolution. By way of non-limiting example, the first structure may comprise raster information at a particular resolution. The second structure may comprise a vector-based structure. By way of non-limiting example, the second structure may comprise vector information that identifies the borders, or edges, of features, such as bodies of water, in the geographic region. The device may then determine the second elevation values for the second layer at the first resolution. In one embodiment, the second elevation values may correspond to location identifiers that identify locations within the identified features.

In one embodiment, during a simulation of the geographic region, a level of detail (LOD) resolution may be determined. The LOD resolution may be different from a resolution of the first structure. The first structure may be scaled, such as, by way of non-limiting example, via an extrapolation or interpolation function, to generate location identifiers and first elevation values at the LOD resolution. The second elevation values for the second layer may then be determined at the LOD resolution.

In one embodiment, first layer attribute values that quantify an attribute associated with the first layer may be stored in association with location identifiers. By way of non-limiting example, a first layer attribute value may quantify a temperature associated with the first layer at the location identified by the respective location identifier. Second layer attribute values that quantify an attribute associated with the second layer at the respective location identified by the location identifier may also be stored in association with the location identifier. By way of non-limiting example, a second layer attribute value may quantify a temperature associated with the second layer at the location identified by the respective location identifier. Thus, the multi-layer DEM structure may contain elevation values associated with different layers of a geographic region, as well as associated information that quantifies differences between layers at the same locations in the geographic region.

In one embodiment, the location identifiers in the multi-layer DEM structure may identify locations in the geographic region at a first resolution. During a simulation of the geographic region, a request may be received for a second multi-layer DEM of at least a portion of the geographic region at a second resolution that differs from the first resolution. The first elevation values and the second elevation values may be scaled to generate the second multi-layer DEM at the second resolution, and the second multi-layer DEM may be provided at the second resolution in response to the request.

Those skilled in the art will appreciate the scope of the embodiment(s) and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the embodiment(s), and together with the description serve to explain the principles of the embodiment(s).

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts disclosed and will recognize applications of these concepts not particularly addressed herein. It should be understood that these concepts and applications fall within the scope of the embodiment(s) and the accompanying claims.

The embodiments relate to a multi-layer digital elevation model (DEM) structure that identifies multiple elevation values for a given location. The multi-layer DEM structure may be generated for an identified geographic region at run-time, during an initialization phase of a simulation provided to a user by a simulator, and/or at other times during the simulation as new geographic regions become relevant to the simulation. Each layer in the multi-layer DEM structure may identify an elevation associated with the layer at a particular location. Each layer may be associated with a particular data type, such as, by way of non-limiting example, a surface type.

Non-limiting examples of surface types include a terrain surface type, a bathymetric surface type, and a water surface type. The multi-layer DEM structure may be used in or by various devices, including but not limited to a simulator, to concurrently render imagery associated with multiple surface types without the need for the device to access multiple different data structures, thereby facilitating the presentation of high-fidelity simulations with multiple surface types in real time. The multi-layer DEM structure may also be used to quickly and efficiently generate one or more additional multi-layer DEM structures at resolutions that may be different from the initially generated multi-layer DEM structure during the course of a simulation.

The multi-layer DEM structure may reduce or eliminate a need to utilize multiple structures by a device, such as but not limited to a simulator, reducing memory fetches, memory swaps, memory utilization, processor utilization, and the like, any of which can negatively impact the performance of a device, including but not limited to a high-fidelity simulator. The multi-layer DEM structure, among other advantages, may facilitate concurrent rendering of multiple surfaces, such as, by way of non-limiting example, terrain surfaces, bathymetric surfaces (e.g., underwater surfaces), and water surfaces.

The multi-layer DEM structure may be generated at run time; in other words, after the initiation of a device that is performing a simulation for a user. Among other advantages, run-time generation of the multi-layer DEM structure may eliminate a need to maintain multiple copies of large datasets at different resolutions on storage devices.

Figure 1:
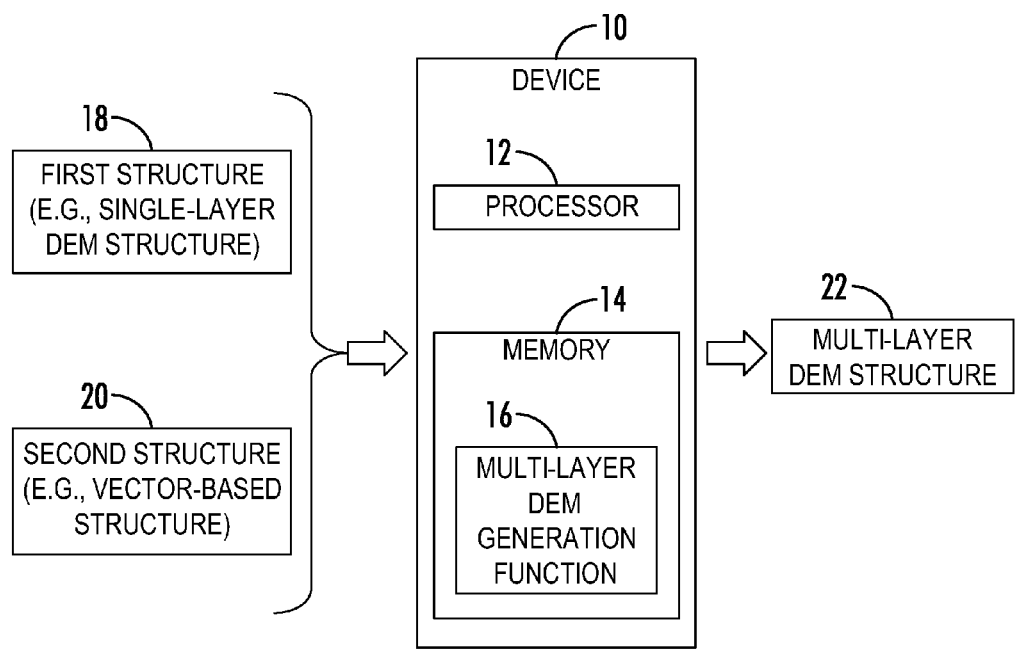
FIG. 1 is a block diagram illustrating a device suitable for practicing various embodiments.
Figure 2:
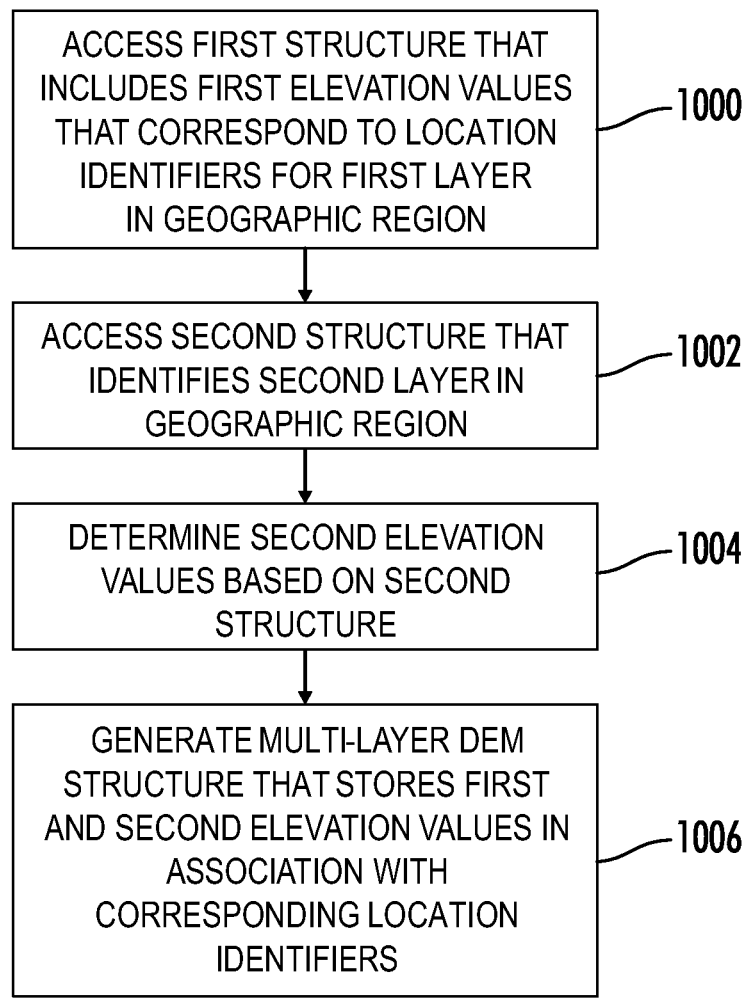
FIG. 2 is a flowchart that illustrates a process for generating a multi-layer digital elevation model (DEM) structure according to one embodiment.

FIG. 1 is a block diagram illustrating a device 10 suitable for practicing embodiments. FIG. 2 is a flowchart that illustrates a process for generating a multi-layer DEM structure according to one embodiment, and will be discussed in conjunction with FIG. 1. The device 10 may comprise a processor 12 and a memory 14. The memory 14 may contain a multi-layer DEM generation function 16 that implements aspects of the process described herein. The multi-layer DEM generation function 16 may comprise software instructions, circuitry, or a combination of both. While for purposes of illustration, functionality described herein may be attributed to the multi-layer DEM generation function 16, it should be apparent that the functionality described herein may be provided by any number of different modules, or functions, depending on a desired implementation. Accordingly, functionality may also be attributed herein to the device 10 without reference to the multi-layer DEM generation function 16.

The device 10 may comprise, for example, a computing device that executes simulator software that provides simulations, or may be a special-purpose simulator device. While for purposes of illustration the term "simulation" is used herein primarily in the context of a visualization of a virtual environment, the embodiments are not so limited, and are applicable to any type of simulation, whether involving visualization or not, in which it is desirable to process information associated with different elevations at locations within a simulated environment.

In one embodiment, the device 10 may read, or otherwise access, a first structure 18 which may include a plurality of first elevation values and a plurality of location identifiers that correspond to locations in a geographic region. The first elevation values may be associated with a first layer in the geographic region, and correspond to respective location identifiers (FIG. 2, block 1000). The first structure 18 may comprise, by way of non-limiting example, a single-layer DEM file that identifies the elevation of terrain in the geographic region. The first elevation values may be identified with respect to a reference surface, such as, by way of non-limiting example, a reference ellipsoid. By way of non-limiting example, the location identifiers may comprise longitude and latitude values that may identify particular locations in the geographic region. The geographic region may comprise any desired geographic region, such as, by way of non-limiting example, a city, a country, a continent, or the entire world. Single-layer DEM files that may identify elevations within geographic regions may be obtained from a number of sources, including, but not limited to, commercial and governmental sources.

In one embodiment, the first layer may correspond to one or more surface types. By way of non-limiting example, the first layer may correspond to a terrain surface of the geographic region, a bathymetric surface type of the geographic region, or a water surface type of the geographic region. In one embodiment, the first layer may also correspond to a composite of surface types, such as both a terrain surface type and a bathymetric surface type of the geographic region. The location identifiers in the first structure 18 may identify locations within the geographic region at a first resolution. By way of non-limiting example, the first structure 18 may contain latitude and longitude identifiers that identify locations in the geographic region every 10 meters horizontally and every 10 meters vertically. In some embodiments, layers may correspond to different elevations within a structure, such as different levels of a parking garage, or different floors of a building.

The device 10 may access a second structure 20 that corresponds to, or identifies, a second layer in the geographic region (FIG. 2, block 1002). The second layer may be associated with a different surface type than that of the first layer, such as, by way of non-limiting example, a water surface type. The second structure 20 may identify features, such as, by way of non-limiting example, bodies of water, in the geographic region. In one embodiment, the second structure 20 may be a vector-based structure, and may define the edges or borders of features, such as, by way of non-limiting example, rivers, streams, ponds, oceans, and the like. Vector-based structures may not have a resolution, but rather may define features in terms of geometrical primitives, such as lines, curves, polygons, and the like, which correspond to locations in the geographic region, and thus may be quite compact. Thus, the second structure 20 may utilize substantially less storage space than the first structure 18. The locations of the geometrical primitives may be identified, for example, via location identifiers, such as, by way of non-limiting example, latitude and longitude values, and elevation values.

The device 10 may align, or otherwise register, the location identifiers from the second structure 20 that identify features in the geographic region with the location identifiers in the first structure 18, so that the features identified in the second structure 20 are aligned with the appropriate locations in the first structure 18. The registration process may involve aligning location identifiers, such as latitude and longitude values, identified in the second structure 20 with those identified in the first structure 18. If the elevation values identified in the first structure 18 are based on a different reference surface than the elevation values, if any, identified in the second structure 20, then the registration process may also involve a conversion or translation of elevation values from one reference surface to another reference surface.

The device 10 may determine, based on the second structure 20, second elevation values for the second layer that correspond to at least some of the plurality of location identifiers (FIG. 2, block 1004). The second elevation values may correspond to location identifiers in the first structure 18 that identify locations that lie within the features identified by the second structure 20. By way of non-limiting example, assume that the first structure 18 includes location identifiers that identify locations in a riverbed, and identify the elevation of the riverbed at such locations (e.g., bathymetric surfaces). Assume further that the second structure 20 identifies the two edges, or riverbanks, of the river. The device 10 may determine, for each location identifier that identifies a location in the riverbed, a second elevation value that identifies the elevation of the surface of the river at that location. Specifically, the device 10 may use an interpolation function that uses two first elevation values from the first layer that may correspond to location identifiers that identify locations at opposing edges of the identified river to determine the elevation of the surface of the river at locations between the two first elevation values.

The device 10 may generate a multi-layer DEM structure 22 that stores the first elevation values and the second elevation values in association with corresponding location identifiers (FIG. 2, block 1006). The multi-layer DEM structure 22 may be used, by way of non-limiting example, by the device 10 to provide a simulation. Non-limiting examples of the use of the multi-layer DEM structure 22 by the device 10 during a simulation include determining collisions of objects in the simulated environment, and rendering, or visualization, of multiple surface types simultaneously. By way of non-limiting example, a user who is navigating a cockpit simulator over the surface of an ocean may be provided with imagery that includes bathymetric surfaces as well as the ocean surface itself, to closely simulate the experience of flying an airplane over the real-world analog of the simulated environment. The multi-layer DEM structure 22 may eliminate the need for the device 10 to access multiple structures to generate such multi-surface imagery, reducing memory fetches, memory swaps, memory utilization, and processor utilization, any of which can negatively impact the performance of the device 10 and jeopardize the ability to provide the user with a high-fidelity simulation.

Storing a multi-layer DEM structure 22 at a relatively high resolution of a large geographic region, such as the entire world, may be impractical due to storage requirements associated with the storage of elevation values for multiple layers at a high resolution. Moreover, some simulations may only require a multi-layer DEM structure 22 at a relatively low resolution, while other simulations may require a multi-layer DEM structure 22 at a relatively high resolution. Using a high-resolution multi-layer DEM structure 22 when only a low-resolution multi-layer DEM structure 22 is needed may result in unnecessary memory utilization, unnecessary processor utilization, and unnecessary memory fetches, and may jeopardize the ability to provide a real-time simulation experience.

Accordingly, in one embodiment, the multi-layer DEM structure 22 may be generated from the first structure 18 and the second structure 20 at a particular resolution that may be determined at run-time, during, by way of non-limiting example, an initialization phase of a simulation. By way of non-limiting example, the device 10 may, based on a location of a viewpoint of the user participating in the simulation, or based on user input that identifies a desired resolution for use in the simulation, require only a relatively low-resolution multi-layer DEM structure 22. In such example, if the first structure 18 identifies locations within the geographic region at a relatively high resolution, the device 10 may scale, such as, by way of non-limiting example, via an extrapolation process, the location identifiers to the desired lower resolution, and generate the multi-layer DEM structure 22 at the desired lower resolution, including determining the second elevation values at the lower resolution, rather than at the relatively high resolution of the first structure 18. The lower-resolution multi-layer DEM structure 22 may require less memory, less processing, and fewer memory fetches to provide the simulation than would be required if a higher-resolution multi-layer DEM structure 22 were generated.

While the DEM structure 22 may be generated during an initialization phase, in some embodiments, DEM structures may continually be generated in accordance with processes and methods discussed herein as additional geographic regions become relevant during the simulation. By way of non-limiting example, as a user's viewpoint location changes during a simulation, additional multi-layer DEM structures may be generated, or the multi-layer DEM structure 22 may be updated, based on new or expanded geographic regions that are within the updated viewpoint location. Such additional multi-layer DEM structure processing may be performed via one or more processing threads in parallel with a simulation module that provides the simulation to the user.

Another advantage to generating the multi-layer DEM structure 22 during run-time is that substantial storage space may otherwise be necessary to store a multi-layer DEM structure 22 that covers a large geographic region, such as the entire world. Because the second structure 20, in one embodiment, may comprise vector-based data, the second structure 20 may be substantially smaller than the first structure 18. Thus, the combined size of the first structure 18 and the second structure 20 may be substantially smaller than a multi-layer DEM structure 22 at the same resolution of the first structure 18, because the second elevation values associated with the second layer are determined at run-time. Thus, certain embodiments may facilitate large-region simulations, such as simulations of the entire world, that involve multiple elevation layers for the entire world without the need to store one or more multi-layer DEM structures 22 at various resolutions.

Figure 3:
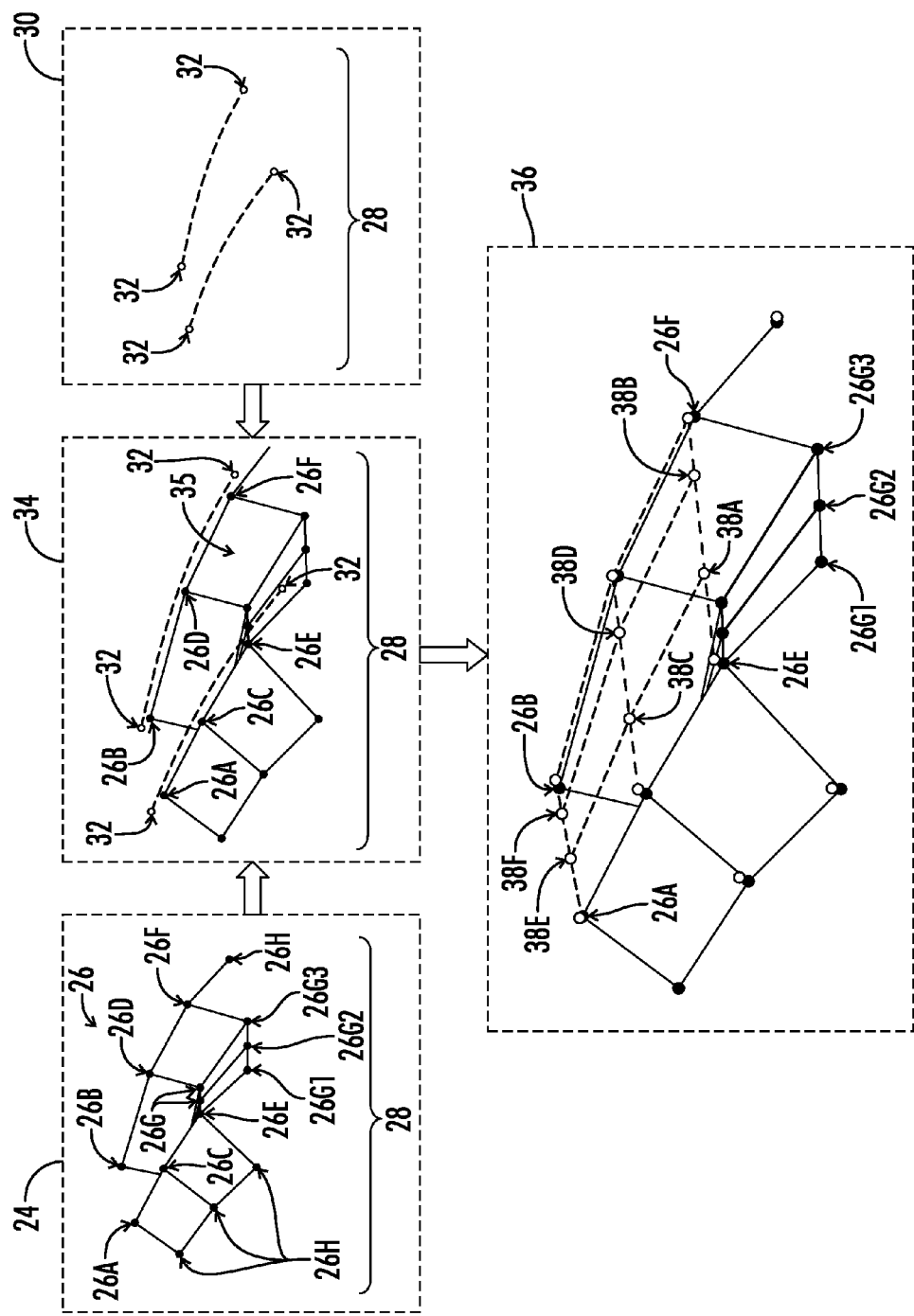
FIG. 3 is a diagram illustrating the generation of a multi-layer DEM structure from a raster-based first structure and a vector-based second structure according to another embodiment.

FIG. 3 is a diagram illustrating pictorially the generation of a multi-layer DEM structure 22 from a raster-based first structure 18 and a vector-based second structure 20 according to another embodiment. Box 24 corresponds to the first structure 18 and illustrates graphically a plurality of locations 26A-26H (generally, locations 26) that may be identified in the first structure 18 for a first layer in a geographic region 28. In this example, the first layer comprises a composite of terrain and bathymetric elevation information that identifies the elevation of terrain surfaces and bathymetric surfaces (i.e., underwater surfaces) in the geographic region 28. In one embodiment, the first structure 18 may have been generated based on multiple sources of data, one of which may identify terrain elevation information and another of which may identify bathymetric elevation information, for example.

Each of the locations 26 is identified in the first structure 18 by a location identifier, such as, by way of non-limiting example, a longitude and latitude, and a first elevation value. Box 24 illustrates graphically how such location identifiers and corresponding first elevation values may be depicted visually to a user when joined together by line segments.

Box 30 corresponds to the second structure 20 and illustrates graphically a plurality of locations 32 that collectively identify the borders of a feature (such as a river as utilized in this non-limiting example) in the geographic region 28. The locations 32 may be identified in the second structure 20 by corresponding location identifiers, each of which may comprise a longitude value, a latitude value, and an elevation value. Note that the river, in this example, is identified using only four location identifiers.

Box 34 illustrates graphically the combination of the locations identified in the first structure 18 and the locations identified in the second structure 20. As illustrated in box 34, the edges of the river identified in the second structure 20 align with the edges of a channel 35 identified in the first structure 18. Assume that in this example a second layer comprises a water surface of bodies of water in the geographic region 28 and thus includes the surface of the river. Because the location identifiers that correspond to locations 26A-26F identify the elevation along the edges of the river running through the geographic region 28, the device 10 may determine second elevation values that correspond to the water surface of the river by interpolating between the known elevations along the edges of the river.

In one embodiment, this may be achieved by determining a bounding box that defines the area of the feature in the geographic region 28. The device 10 may then iterate through each location identifier in the first structure 18 within that bounding box row by row. Using geometric calculations, the device 10 may determine the intersections between the vector data identified in the second structure 20 and the row of location identifiers in the first structure 18. If the bounding box is convex, at most two intersections per row may be identified. The two intersected location identifiers and corresponding first elevation values may then be saved as a min and a max, respectively. If only a single intersection is identified, the corresponding first elevation value may be saved as both min and mix. The device 10 may then iterate through each location identifier identified in the first structure 18 that is within the bounds, and for each such location identifier a second elevation value may be determined by interpolating between the min and the max. Any interpolation function may be utilized, including, for example, a linear interpolation function, a bilinear interpolation function, or a spline interpolation function.

An example of this will be explained with reference to box 36. The device 10 may first determine that the location identifiers that correspond to the locations 26E and 26F intersect with the edges of the river defined by the locations 32 from the second structure 20. By way of non-limiting example, assume that a location identifier A identifies the location 26E and has a value of $X_1, Y_1$, wherein $X_1$ is a latitude value and $Y_1$ is a longitude value, and has a corresponding first elevation value of $Z1_1$ which identifies an elevation of the first layer at the location $X_1, Y_1$.

By way of non-limiting example, assume that a location identifier B identifies the location 26F and has a value of $X_2, Y_2$, and a corresponding first elevation value of $Z1_2$. The device 10 may determine that the location 26G1 is a location that lies between the locations 26E and 26F. By way of non-limiting example, assume that the location 26G1 is identified by a location identifier C, which has a value of $X_3, Y_3$, and a corresponding first elevation value of $Z1_3$. The device 10 may interpolate between the first elevation values $Z1_1$ and $Z1_2$ to determine a second elevation value $Z2_3$ that identifies the elevation of the water surface of the river at location $X_3, Y_3$. The second layer location identified by $X_3, Y_3, Z2_3$ is shown in box 36 as location 38A. The device 10 may then store the first elevation value $Z1_3$ and the second elevation value $Z2_3$ in association with the location identifier $X_3, Y_3$ in a multi-layer DEM structure 22. Thus, the data $X_3, Y_3, Z1_3, Z2_3$ may be stored together as a unit. A similar process may be performed with respect to the locations 38B-38F. The multi-layer DEM structure 22 may store a default second layer value, such as, by way of non-limiting example, a zero, or a null value, in association with a location identifier when the second layer does not exist at a particular location (e.g., where there is no water at such location).

Figure 4:
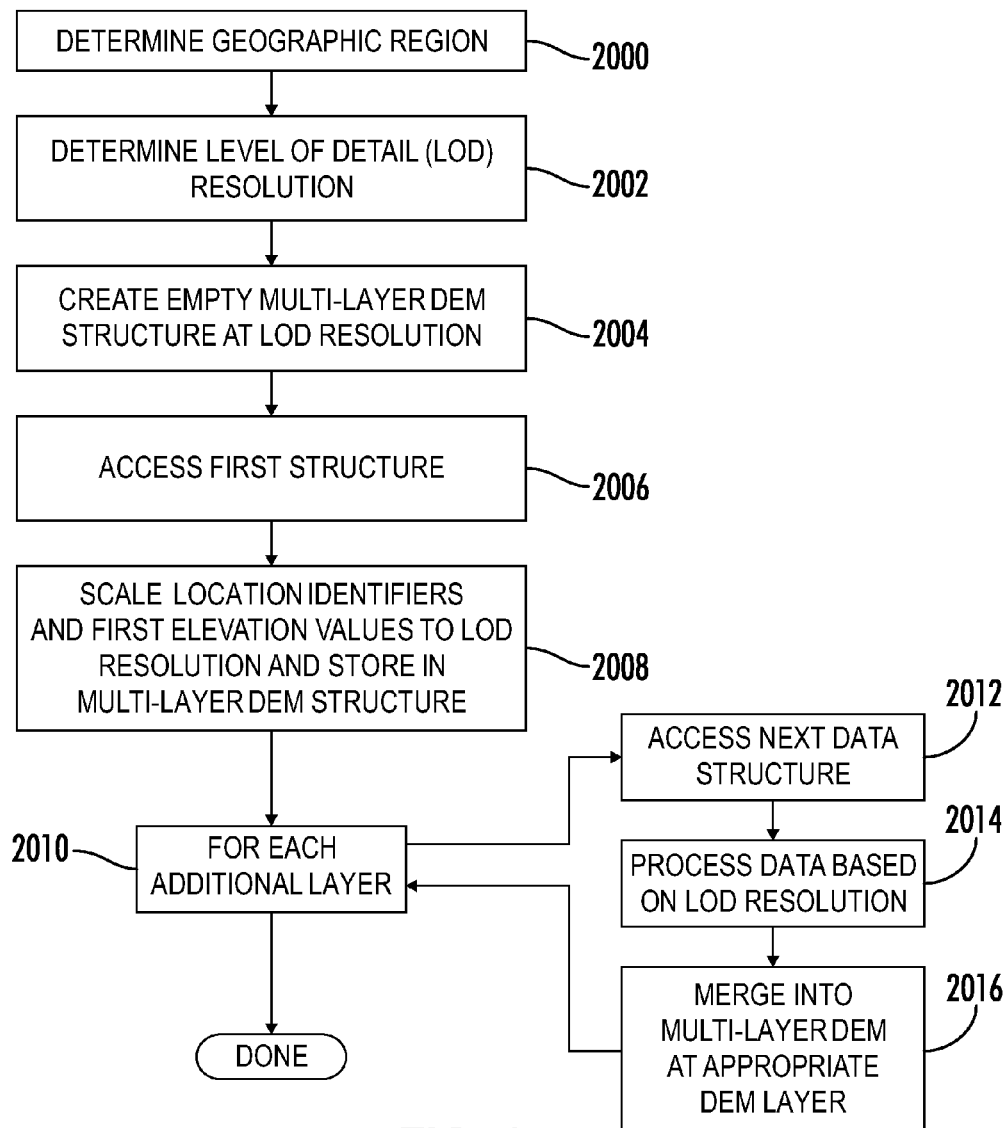
FIG. 4 is flowchart illustrating a process for generating a multi-layer DEM structure according to another embodiment.

FIG. 4 is a flowchart illustrating a process for generating a multi-layer DEM structure according to another embodiment. Assume that a user initiates a simulation. The device 10 may determine a particular geographic region for the simulation (block 2000). The determination may be based, by way of non-limiting example, on a viewpoint location of the user, or on input by the user who may identify a particular geographic region of interest. The device 10 may determine a level of detail (LOD) resolution (block 2002). The LOD resolution may be determined in any desired manner, including, but not limited to, being based on input by the user, a default LOD resolution, or a location of the viewpoint of the user with respect to the geographic region.

The device 10 may generate an empty multi-layer DEM structure at the LOD resolution (block 2004). In particular, the empty multi-layer DEM structure may comprise a structure in the memory 14 (FIG. 1), or on a storage device, that may contain sufficient space to contain location identifiers and elevation values for multiple layers that identify locations and elevation values in the particular geographic region based on the LOD resolution. The device 10 may access the first structure 18 (block 2006). In this embodiment, assume that the first structure 18 comprises location identifiers that identify locations at a first resolution for a large geographic region that is substantially larger than the particular geographic region of interest to the user, as well as first elevation values associated with a first layer in such large geographic region. In such embodiment, the empty multi-layer DEM structure may be substantially smaller than the first structure 18 because the empty multi-layer DEM structure identifies locations for a substantially smaller geographic region than that described by the first structure 18.

Assume further that the LOD resolution is greater than the first resolution. The device 10 may scale, such as by way of non-limiting example, via an interpolation function, the location identifiers in the first structure 18 to generate additional location identifiers sufficient to generate the multi-layer DEM structure at the LOD resolution. The process for altering the resolution of a structure will be referred to herein generally as "scaling," and may involve the generation of additional points of data, such as, but not limited to, additional location identifiers and elevation values, when generating a higher-resolution structure from a lower-resolution structure, and may involve the generation of fewer location identifiers and elevation values when generating a lower-resolution structure from a higher-resolution structure. Scaling may involve an interpolation function or process when generating a higher-resolution structure from a lower-resolution structure, and an extrapolation function or process when generating a lower-resolution structure from a higher-resolution structure, although any processing that generates fewer or more points of data may be utilized in the embodiments.

The device 10 may also scale, such as, by way of non-limiting example, via an interpolation process, the first elevation values to generate first elevation values at the LOD resolution. The generated location identifiers and corresponding first elevation values may be stored in the multi-layer DEM structure (block 2008).

The device 10 may then begin processing one or more additional structures to generate elevation values for one or more additional layers (block 2010). While for purposes of illustration a two-layer DEM structure 22 has been discussed herein, the embodiments are not limited to the generation of a two-layer DEM structure 22, and may generate multi-layer DEM structures 22 having any number of desired layers.

For purposes of illustration, assume that a two-layer multi-layer DEM structure 22 will be generated. The device 10 may access the second structure 20 (block 2012). The device 10 may then generate second elevation values in accordance with the desired LOD resolution, as described above, by way of non-limiting example, with reference to FIG. 3 (block 2014). The device 10 may store the second elevation values in the multi-layer DEM structure 22 in association with corresponding location identifiers (block 2016). While elevation values for only two layers are described herein, the process described with respect to blocks 2010-2016 may be repeated for additional layers, if a multi-layer DEM structure 22 that contains more than two layers were being generated.

In one embodiment, attribute values that quantify an attribute associated with a particular layer at a particular location may also be stored in the multi-layer DEM structure 22. By way of non-limiting example, such attributes may comprise pressure, temperature, surface type, moisture, or the like. Thus, by way of non-limiting example, the multi-layer DEM structure 22 may not only identify multiple elevation values for each location identifier, but may also identify the temperature at each layer corresponding to each location identifier. Different types of attributes may be relevant to different elevation layers. By way of non-limiting example, for a second elevation layer of an environment which is a water surface layer, the attributes may comprise a sea state attribute that identifies a sea state that represents water turbulence at a particular location, or a clarity attribute that identifies the clarity of the water at a particular location. In one embodiment, the attributes may be used by downstream processes, such as during the graphics rendering process, to generate imagery associated with the elevation layer.

High-fidelity simulations that involve the rendering of realistic imagery may require substantial processing. An object, such as a ground vehicle, which is far away from a user's viewpoint location in the virtual environment, may be rendered with substantially less detail than an object that is much closer to the user's viewpoint location, and may still appear realistic to the user because extra detail would not be visually perceivable by the user at that distance. It may be desirable, therefore, to render different portions of a geographic region, and/or objects in such geographic region, at different LOD resolutions, such that the rendering process does not generate objects at LOD resolutions that are higher than necessary.

As another non-limiting example, assume that a user navigates a simulated airplane through a virtual environment at a relatively low altitude. Those regions that are relatively close to the cockpit window may be rendered at a relatively high LOD resolution, while those regions substantially farther from the cockpit window but still within the view of the user may be rendered at a relatively low LOD resolution, with negligible or no perceived difference by the user.

Figure 5:
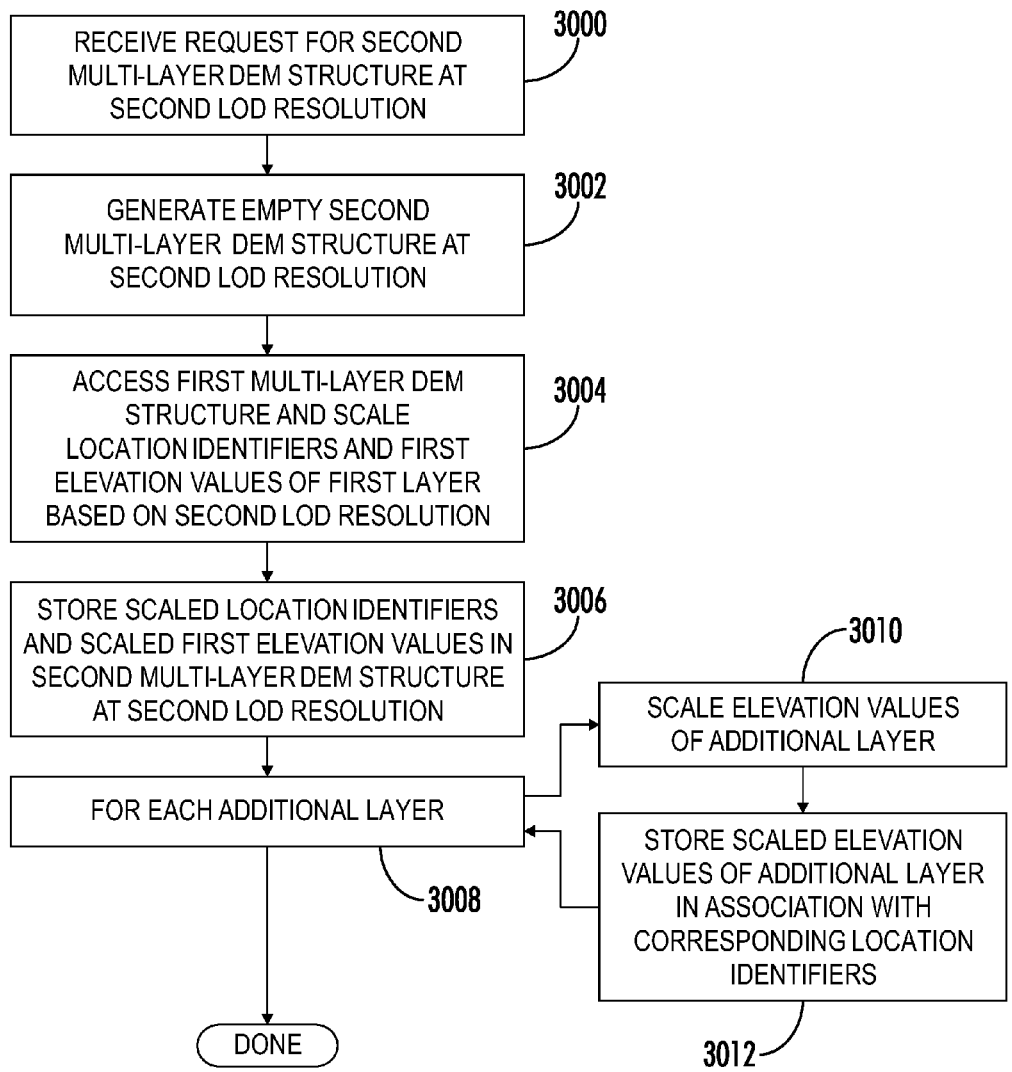
FIG. 5 is a flowchart illustrating a method for generating a second multi-layer DEM structure at a second level of detail (LOD) resolution based on a first multi-layer DEM structure at a first resolution, according to one embodiment.

To facilitate the use of multiple different LOD resolutions of a geographic region, in one embodiment, the device 10 may generate one or more second multi-layer DEM structures 22 which are based on a first multi-layer DEM structure 22. FIG. 5 is a flowchart illustrating a method for generating a second multi-layer DEM structure 22 at a second LOD resolution based on a first multi-layer DEM structure 22, which is at a first LOD resolution.

By way of non-limiting example, assume initially that the device 10 generates a first multi-layer DEM structure 22 at a first LOD resolution, and assume further that the first multi-layer DEM structure 22 comprises two layers. The device 10, during a simulation, may receive a request for a second multi-layer DEM structure 22 at a second LOD resolution that is different from the first LOD resolution (block 3000). The request may be received from, for example, a rendering function that executes on the device 10, or is communicatively coupled to the device 10, that desires a second multi-layer DEM structure 22 of the geographic region, or a portion of the geographic region, at a higher or lower LOD resolution than that of the first multi-layer DEM structure 22. By way of non-limiting example, assume that the request is for a second multi-layer DEM structure 22 at a lower LOD resolution. The device 10 may generate an empty second multi-layer DEM structure 22 at the desired LOD resolution (block 3002). Note that the second multi-layer DEM structure 22 may be for the entire geographic region identified in the first multi-layer DEM structure 22, or may be for a subset of the geographic region identified in the first multi-layer DEM structure 22.

The device 10 may access the first multi-layer DEM structure 22 and, based on the location identifiers and first elevation values in the first multi-layer DEM structure 22 associated with the geographic region, perform a scaling process to determine scaled location identifiers and scaled first elevation values at the desired lower LOD resolution (block 3004). Thus, there may be fewer scaled location identifiers in the second multi-layer DEM structure 22 than the number of location identifiers in the first multi-layer DEM structure 22. The scaled location identifiers and scaled first elevation values may be stored in the second multi-layer DEM structure 22 (block 3006).

The device 10 may then begin processing the second elevation values associated with the second layer identified in the first multi-layer DEM structure 22 (block 3008). The device 10 may perform the scaling process on the second elevation values in the first multi-layer DEM structure 22 to determine scaled second elevation values at the second LOD resolution (block 3010). The previously scaled location identifiers need not be scaled a second time, reducing processing time and memory allocation that would otherwise be needed if multiple single-layer DEM structures 22 were being utilized to identify elevations at different layers of a geographic region. The scaled second elevation values may be stored in the second multi-layer DEM structure 22 in association with corresponding location identifiers (block 3012). While elevation values for only two layers are described herein, the process described with respect to blocks 3008-3012 may be repeated for additional layers, if a second multi-layer DEM structure 22 that contains more than two layers is being generated.

Figure 6:
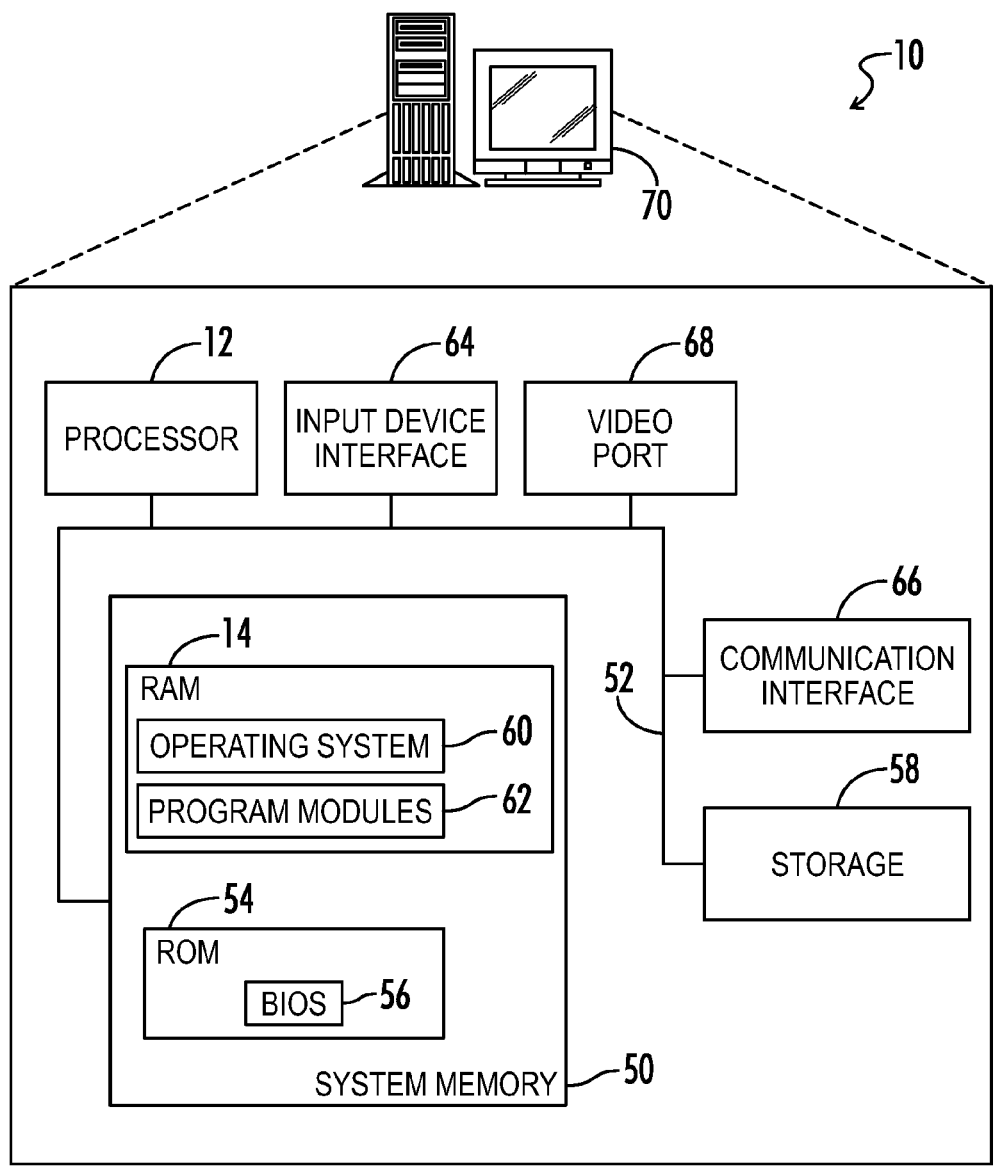
FIG. 6 is a block diagram illustrating a device, according to one embodiment.

FIG. 6 is a block diagram illustrating the device 10, according to one embodiment. The device 10 may comprise, for example, a laptop computer, a desktop computer, a workstation, a server, or any other processing device comprising a processor 12 and capable of implementing the functionality described herein. The processor 12 may be coupled to a system memory 50 via a system bus 52. The system bus 52 may provide an interface for system components including, but not limited to, the system memory 50 and the processor 12. The processor 12 may be any of various commercially available or proprietary processors. Dual microprocessors and other multi-processor architectures may also be employed as the processor 12.

The system bus 52 may be any of several types of bus structures that may further interconnect to a memory bus (with or without a memory controller), a peripheral bus, and/or a local bus using any of a variety of commercially available bus architectures. The system memory 50 may include non-volatile memory 54 (e.g., read only memory (ROM), erasable programmable read only memory (EPROM), electrically erasable programmable read only memory (EEPROM), etc.) and/or volatile memory 14 (e.g., random access memory (RAM)). A basic input/output system (BIOS) 56 may be stored in the non-volatile memory 54, and can include the basic routines that help to transfer information between elements within the device 10. The volatile memory 14 may also include a high-speed RAM, such as static RAM, for caching data.

The device 10 may further include the storage 58, which may comprise, by way of non-limiting example, an internal hard disk drive (HDD) (e.g., enhanced integrated drive electronics (EIDE) or serial advanced technology attachment (SATA)) for storage, solid-state memory, flash memory, or the like. The storage 58 and associated computer-readable and computer-usable media provide non-volatile storage of data and data structures such as the first structure 18, second structure 20, multi-layer DEM structure 22, and the like, as well as computer-executable instructions for implementing functionality described herein. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing the novel functionality described herein.

A number of modules may be stored in the storage 58 and in the volatile memory 14, including an operating system 60 and one or more program modules 62, such as the multi-layer DEM generation function 16 (FIG. 1), which may implement the functionality described herein in whole or in part. It is to be appreciated that the embodiments can be implemented with various commercially available operating systems 60 or combinations of operating systems 60.

All or a portion of the embodiments may be implemented as a computer program product, such as a non-transitory computer-usable or computer-readable medium having a computer-readable program code embodied therein. The computer-readable program code can include complex software instructions for implementing the functionality of the embodiments described herein when executed on the processor 12. The processor 12, in conjunction with the program modules 62 in the volatile memory 14, may serve as a controller, or as a control system, for the device 10 that is configured to, or adapted to, implement the functionality described herein.

An administrator may be able to enter commands and information into the device 10 through one or more input devices (not illustrated), such as, by way of non-limiting example, a touch-sensitive display screen; a keyboard; or a pointing device, such as a mouse. Other input devices may include a microphone, an infrared (IR) remote control, a joystick, a game pad, a stylus pen, or the like. These and other input devices may be connected to the processor 12 through an input device interface 64 that is coupled to the system bus 52, but may be connected by other interfaces such as a parallel port, an IEEE 1394 serial port, a game port, a universal serial bus (USB) port, an IR interface, etc. The device 10 may also include a communication interface 66 that is configured to communicate with a network. The device 10 may also include a video port 68 configured to drive one or more display devices 70, via which simulations may be provided to a user, by way of non-limiting example.

As discussed previously, while for purposes of illustration a two-layer DEM structure 22 has been discussed herein, the embodiments are not limited to the generation of a two-layer DEM structure 22, and the embodiments herein may be used to generate multi-layer DEM structures 22 having any number of desired layers.

Those skilled in the art will recognize improvements and modifications to the embodiments. All such improvements and modifications are considered within the scope of the concepts disclosed herein and the claims that follow.

What is claimed is:

1. A method, comprising:
   accessing, by a device, a first structure comprising a plurality of first elevation values and a plurality of location identifiers that identify corresponding locations in a geographic region at a first resolution,
   the first elevation values identifying elevations in a first elevation layer in the geographic region at respective locations, wherein each first elevation value corresponds to one of the location identifiers;
   accessing, by the device, a second structure that identifies a second elevation layer in the geographic region that differs from the first elevation layer;
   determining, based on the second structure, second elevation values at the first resolution that identify elevations in the second elevation layer at locations that correspond to at least some of the plurality of location identifiers,
   wherein at least some of the second elevation values differ from first elevation values that correspond to the same location identifiers; and
   generating a multi-layer digital elevation model (DEM) structure that includes the first elevation values and the second elevation values in association with corresponding location identifiers.

2. The method of claim 1, wherein the second structure is a vector-based structure.

3. The method of claim 2, wherein the second structure identifies one or more features in the geographic region.

4. The method of claim 3, wherein the second elevation values correspond to location identifiers that identify locations within the one or more features.

5. The method of claim 3, wherein the one or more features comprises one of a river and an ocean.

6. The method of claim 1, further comprising:
   determining, during a simulation of the geographic region, a level of detail (LOD) resolution that is different from the first resolution;
   scaling the location identifiers to determine scaled location identifiers that identify locations in the geographic region at the LOD resolution; and
   wherein determining the second elevation values for the second elevation layer comprises determining the second elevation values for the second elevation layer at the LOD resolution.

7. The method of claim 1, further comprising:
   storing, in association with the location identifiers, first layer attribute values that identify an attribute associated with the first elevation layer at a respective location identified by the location identifier, and second layer attribute values that identify an attribute associated with the second elevation layer at the respective location identified by the location identifier.

8. The method of claim 1, wherein the first elevation layer is associated with a first surface type, and the second elevation layer is associated with a second surface type.

9. The method of claim 1, further comprising:
   receiving, during a simulation of the geographic region, a request for a second multi-layer DEM structure of at least a portion of the geographic region at a second resolution, wherein the second resolution is different from the first resolution;
   scaling the first elevation values and the second elevation values to generate the second multi-layer DEM structure at the second resolution; and
   providing the second multi-layer DEM structure at the second resolution in response to the request.

10. The method of claim 1, further comprising:
    receiving, during an initialization phase of a simulation, a viewpoint location associated with a user; and
    determining the geographic region based on the viewpoint location.

11. A device, comprising:
    a memory;
    a processor coupled to the memory, and configured to:
      access a first structure that comprises a plurality of first elevation values and a plurality of location identifiers that identify corresponding locations in a geographic region at a first resolution, the first elevation values identifying elevations in a first elevation layer in the geographic region at respective locations, wherein each first elevation value corresponds to one of the location identifiers;
      access a second structure that identifies a second elevation layer in the geographic region that differs from the first elevation layer;
      determine, based on the second structure, second elevation values at the first resolution that identify elevations in the second elevation layer at locations that correspond to at least some of the plurality of location identifiers, wherein at least some of the second elevation values differ from first elevation values that correspond to the same location identifiers; and
      generate a multi-layer digital elevation model (DEM) structure that includes the first elevation values and the second elevation values in association with corresponding location identifiers.

12. The device of claim 11, wherein the second structure is a vector-based structure.

13. The device of claim 11, wherein the processor is further configured to:
    determine, during a simulation of the geographic region, a level of detail (LOD) resolution that is different from the first resolution;
    scale the location identifiers to determine scaled location identifiers that identify locations in the geographic region at the LOD resolution; and
    wherein to determine the second elevation values for the second elevation layer, the processor is further configured to determine the second elevation values for the second elevation layer at the LOD resolution.

14. The device of claim 11, wherein the processor is further configured to:
    store, in association with the location identifiers, first layer attribute values that identify an attribute associated with the first elevation layer at a respective location identified by the location identifier, and second layer attribute values that identify an attribute associated with the second elevation layer at the respective location identified by the location identifier.

15. The device of claim 11, wherein the first elevation layer is associated with a first surface type, and the second elevation layer is associated with a second surface type.

16. A computer program product for generating a multi-layer digital elevation model (DEM) structure, the computer program product stored on a non-transitory computer-readable storage medium and including instructions configured to cause a processor to carry out the steps of:

accessing a first structure that comprises a plurality of first elevation values and a plurality of location identifiers that identify corresponding locations in a geographic region at a first resolution, the first elevation values identifying elevations in a first elevation layer in the geographic region at respective locations, wherein each first elevation value corresponds to one of the location identifiers;

accessing a second structure that identifies a second elevation layer in the geographic region that differs from the first elevation layer;

determining, based on the second structure, second elevation values at the first resolution that identify elevations in the second elevation layer at locations that correspond to at least some of the plurality of location identifiers, wherein at least some of the second elevation values differ from first elevation values that correspond to the same location identifiers; and generating the multi-layer DEM structure that stores the first elevation values and the second elevation values in association with corresponding location identifiers.

17. The computer program product of claim 16, wherein the second structure is a vector-based structure.

18. The computer program product of claim 16, wherein the location identifiers in the first structure identify locations in the geographic region at a first resolution, and wherein the instructions are further configured to cause the processor to carry out the steps of:

determining, during a simulation of the geographic region, a level of detail (LOD) resolution that is different from the first resolution;

scaling the location identifiers to determine scaled location identifiers that identify locations in the geographic region at the LOD resolution; and wherein determining the second elevation values for the second elevation layer further comprises determining the second elevation values for the second elevation layer at the LOD resolution.

19. The computer program product of claim 16, wherein the instructions are further configured to cause the processor to carry out the steps of:

storing, in association with the location identifiers, first layer attribute values that identify an attribute associated with the first elevation layer at a respective location identified by the location identifier, and second layer attribute values that identify an attribute associated with the second elevation layer at the respective location identified by the location identifier.

20. The method of claim 8, wherein the first surface type comprises a bathymetric surface type, and the second surface type comprises a water surface type.

21. The method of claim 1, wherein each location identifier comprises a longitude value and a latitude value.

* * * * *